United States Patent [19]

Giles et al.

[11] Patent Number: 5,073,981
[45] Date of Patent: Dec. 17, 1991

[54] OPTICAL COMMUNICATION BY INJECTION-LOCKING TO A SIGNAL WHICH MODULATES AN OPTICAL CARRIER

[75] Inventors: Clinton R. Giles, Middletown; Tingye Li, Rumson; Thomas H. Wood, Highlands, all of N.J.

[73] Assignee: AT&T Bell Laboratories, Murray Hill, N.J.

[21] Appl. No.: 373,670

[22] Filed: Jun. 28, 1989

Related U.S. Application Data

[63] Continuation of Ser. No. 146,918, Jan. 22, 1988, abandoned.

[51] Int. Cl.$^5$ .................................. H04B 10/04
[52] U.S. Cl. ................................ 359/174; 372/8; 372/18; 372/25; 372/70; 359/900
[58] Field of Search .................. 455/601–602, 455/608–609, 612, 619, 618, 610, 611, 613; 372/8, 12, 18, 25, 30, 32, 44, 70

[56] References Cited

U.S. PATENT DOCUMENTS

| 4,455,657 | 6/1984 | Byer | 372/32 |
| 4,523,290 | 6/1985 | Hyatt | 364/862 |
| 4,546,244 | 10/1985 | Miller | 372/12 |
| 4,703,993 | 11/1987 | Hinton | 364/822 |
| 4,705,344 | 11/1987 | Hinton | 364/822 |
| 4,752,931 | 6/1988 | Dutcher et al. | 372/10 |
| 4,769,820 | 9/1988 | Holmes | 372/33 |
| 4,879,761 | 11/1989 | Webb | 455/601 |

OTHER PUBLICATIONS

*Electronics Letters*, vol. 21, No. 16, Aug. 1, 1985, "100 ps Wavegide Multiple Quantum Well (MQW) Optical Modulator With 10:1 On/Off Ratio" by T. H. Wood et al, pp. 693–694.

*Applied Physics Letter*, 48 (21), May 26, 1986, "Direct Measurement of the Electric-Field-Dependent Absorption Coefficient in GaAs/AlGaAs Multiple Quantum Wells" by T. H. Wood et al, pp. 1413–1415.

*IEEE Journal Quantum Electronics*, vol. QE-21, No. 9, Sep. 1985, "The Quantum Well Self-Electrooptic Effect Device: Optoelectronic Bistability and Oscillation, and Self-Linearized Modulation", by David A. B. Miller et al, pp. 1462–1476.

*Applied Physics Letters*, vol. 44(1), Jan. 1, 1984, "High-Speed Optical Modulation with GaAs/GaAlAs Quantum Wells in a p-i-n Diode Structure", by T. H. Wood et al., pp. 16–18.

*Proceedings of the IEEE*, vol. 61, No. 10, Oct. 1973, "Injection Locking of Microwave Solid-State Oscillators", by Kaneyuki Kurokawa, pp. 1386–1410.

*Applied Physics Letter*, vol. 47 (11), Dec. 1, 1985, "Strong Polarization-Sensitive Electroabsorption in GaAs/AlGaAs Quantum Well Waveguides" by J. S. Weiner et al, pp. 1148–1150.

ECOC '87, vol. II, Helsinki, Finland, "Towards an All Optical Regenerator", M. J. O'Mahony, p. 11.

*Basic Theory and Application of Tunnel Diodes*, D. VanNostrand Co., 1962, Section 7-11, Sylvester P. Gentile, pp. 204–207.

Weik, Communications Standard Dictionary, p. 510, Definition of "Linearity".

*Primary Examiner*—Curtis Kuntz
*Assistant Examiner*—L. Pascal
*Attorney, Agent, or Firm*—Samuel H. Dworetsky

[57] ABSTRACT

An optical communication system is disclosed including an all-optical device whose output modulated optical beam is locked to an input modulated optical beam. In a specific embodiment of the system, the device may be a self-electro-optic effect device (SEED), which is operated as an oscillator by means of an associated tank circuit. Such an embodiment permits recovery of a clock frequency from a bit stream which is input into the device. When the output of the device is directed into an optical decision element, an all-optical regenerator may be realized.

25 Claims, 9 Drawing Sheets

INJECTION LOCK IN DEVICE
101

FIG. 7
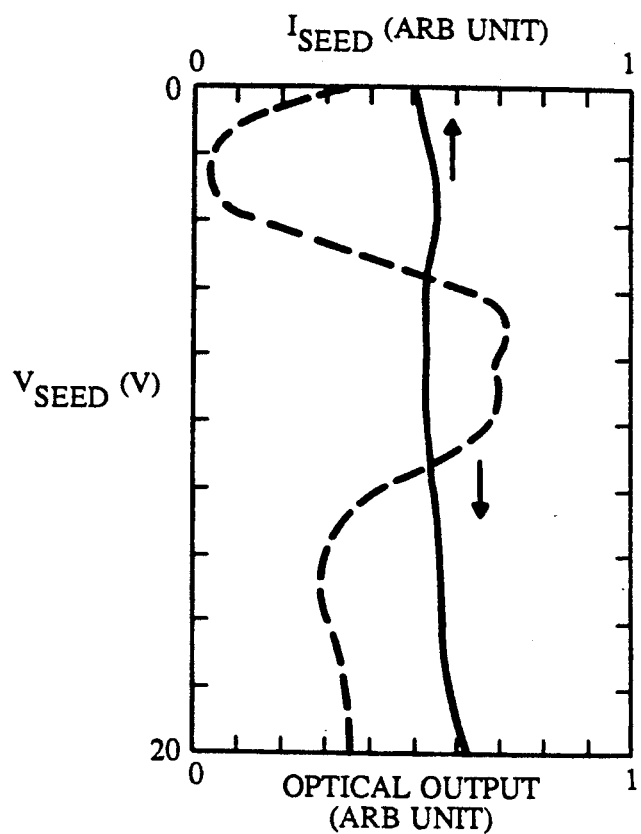
FIG. 8
FIG. 8A
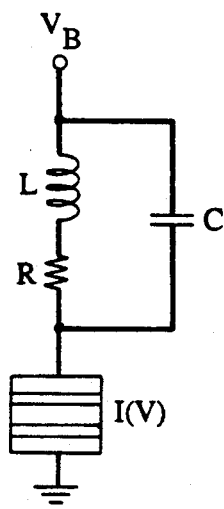
FIG. 8B
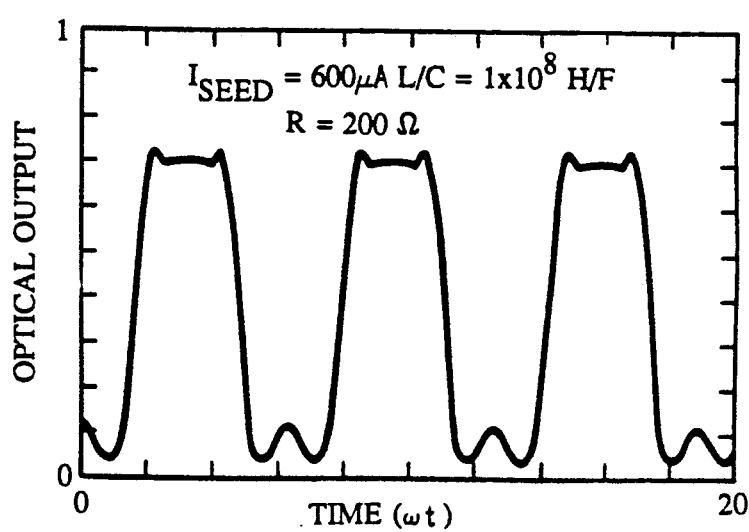

FIG. 9
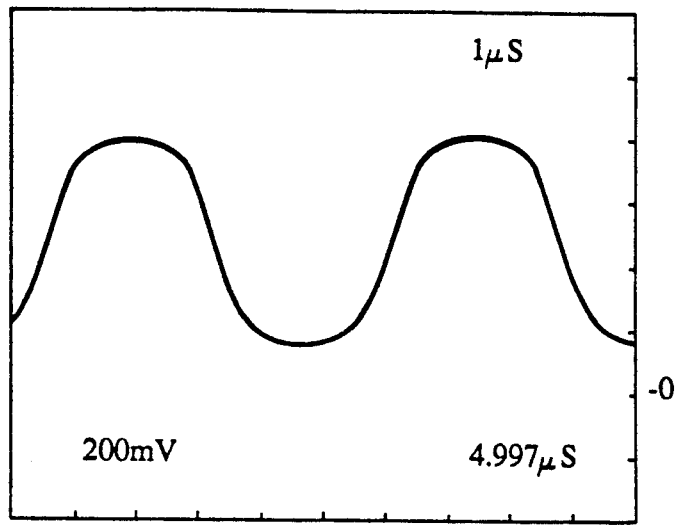
FIG. 10
FIG. 10A
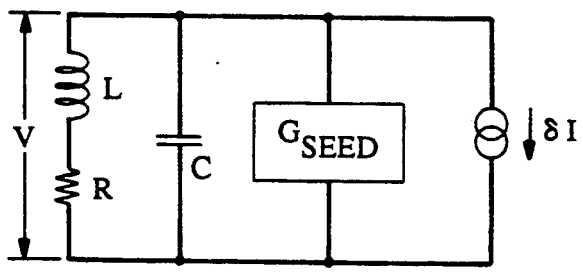
FIG. 10B
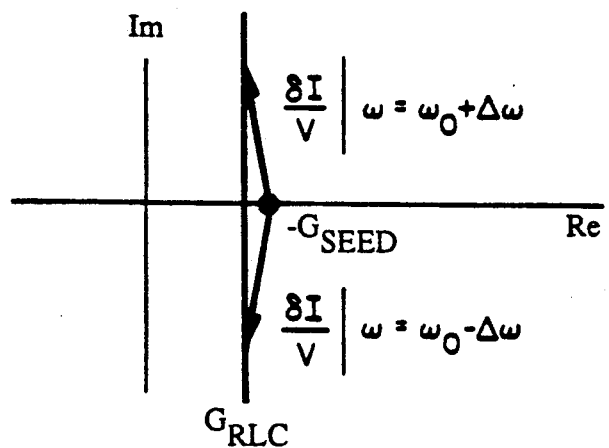

FIG. 13
FIG. 13A
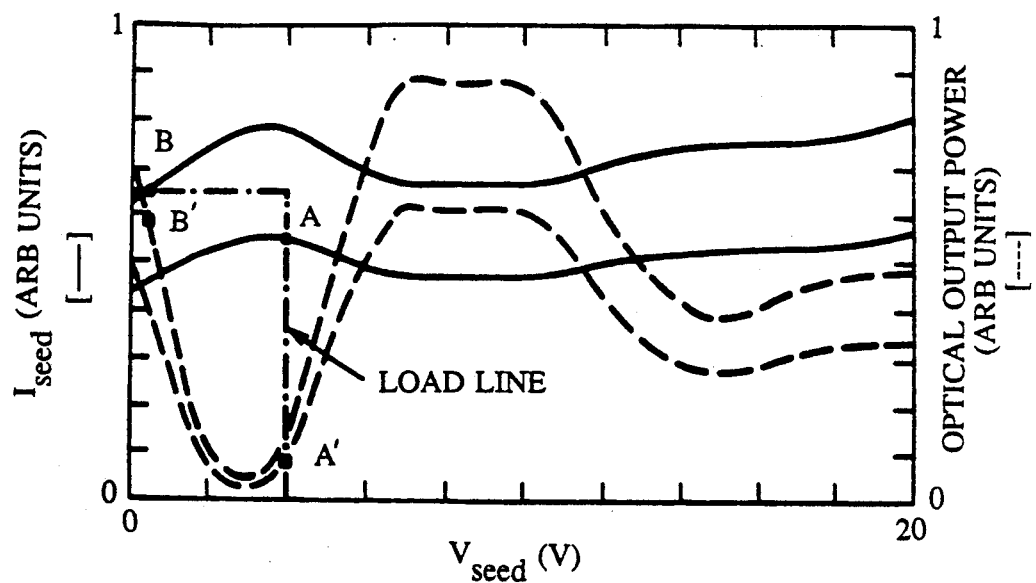
FIG. 13B
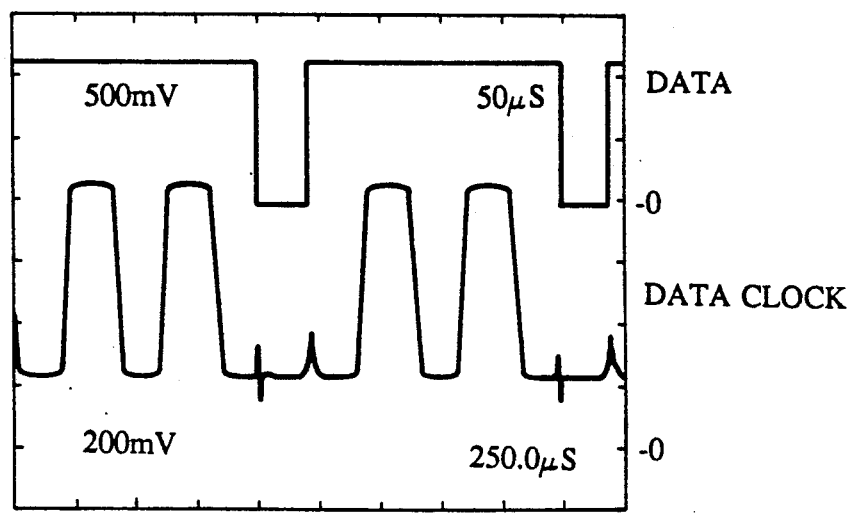

FIG. 14
FIG. 14A
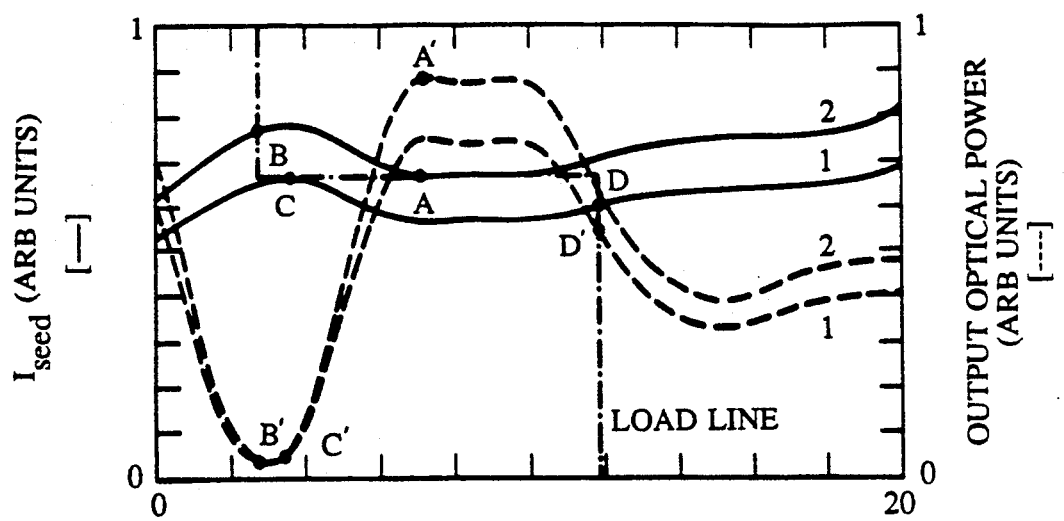
FIG. 14B
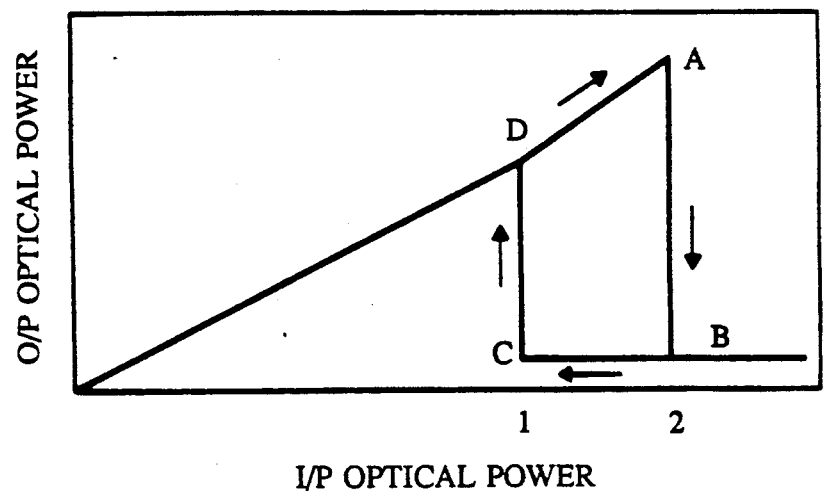

OPTICAL COMMUNICATION BY INJECTION-LOCKING TO A SIGNAL WHICH MODULATES AN OPTICAL CARRIER

This application is a continuation of application Ser. No. 146,918, filed on Jan. 22, 1988 now abandoned.

TECHNICAL FIELD

This invention relates to optical communication systems. Such systems involve optical carrier waves modulated by "signal" frequencies. In the inventive system, an output signal frequency is "locked", in phase and frequency, to an input signal frequency, by means of an "all-optical" device. The device can be used to recover an optical clock signal from the input beam. When combined with a subsequent optical decision element, the inventive device provides the last remaining element necessary to fabricate an all optical regenerator.

BACKGROUND OF THE INVENTION

The economic advantages of optical communications derive primarily from the information carrying capacity of optical fiber. These economies can be more fully realized if information processing, as well as transmission, is performed with the optical signal. However, to date, little, if any, of the information processing is performed with the optical signal. Instead, the optical signal is transformed to an electrical signal, the information processing is performed with the electrical signal, and the processed electrical signal is then transformed back to an optical signal for transmission. Even the standard regeneration function, which must be performed many times during the course of any long distance transmission, is done by first transforming the optical signal to an electrical signal. Consequently, in any long distance optical communication system, the optical signal is transformed into an electrical signal numerous times during the course of transmission. This invention, for the first time, allows for the fabrication of an all-optical regenerator—a device which can detect an incoming optical signal, and emit an amplified and retimed version of that optical signal, without transforming the optical signal into only an electrical signal.

The search for an all-optical regenerator has been ongoing for many years. However, a critical problem, central to the design of any all-optical regenerator, has remained unsolved—the problem of optical timing, i.e., the recovery of an optical clock signal from an input optical signal, without transforming the optical signal into an electrical signal. As noted in a recent review (M. J. O'Mahoney, "Toward an All-Optical Regenerator", ECOC '87, Vol II, page 11, Helsinki, Finland), design suggestions have only been addressed to the untimed regenerator, since "it avoids the need for optical retiming, which is as yet an unsolved problem".

SUMMARY OF THE INVENTION

The invention is founded on the realization that an "all-optical pulser", which produces an optical carrier wave modulated at a "signal" frequency, can be "injection-locked" by an input signal that modulates another optical carrier. The output signal frequency is locked in phase and frequency to the selected input signal frequency. This is to be distinguished from prior injection-locked optical devices that involve "locking" only to the optical "carrier" frequency.

The input signal may comprise an optical carrier modulated by a data stream. In such a case, the input signal comprises many Fourier component frequencies, perhaps including a "clock frequency". The optical pulser can then be "locked", for example, to the clock frequency, and will produce an optical beam which is modulated at the clock frequency of the input signal, and in phase with it. In the embodiment of the invention that involves an all-optical regenerator, the resulting optical "clock" output is combined with the input signal in a decision element, whose optical output is then a retimed, reshaped and amplified, or "regenerated", version of the original input signal.

BRIEF DESCRIPTION OF THE DRAWINGS

FIG. 7 is a representation, for the device of FIG. 6, of the oscillator-SEED current and light transmission as a function of reverse bias voltage with constant incident light power at $\lambda = 856$ nm;

FIG. 8 is schematic representation of (a) an oscillator equivalent circuit for large-signal calculation; and (b) an example of a predicted optical clock waveform;

FIG. 9 is a schematic representation of the optical output of a SEED oscillator with 173 kHz resonance frequency;

FIG. 10 is schematic representation of (a) an AC equivalent circuit model of an injection locked oscillator; and (b) the lock-in range determined from satisfying the locked-in conditions $(G_{RLC} + G_{SEED})V = \delta I$;

FIG. 13 is schematic representation, for an optical AND gate comprising a SEED, of (a) SEED I(V), L(V) and current source load-line for AND gate operation; and, (b) an example, for an AND gate of peak clock and data photocurrents each equal to 7.2 $\mu$A;

FIG. 14, parts (a) and (b) are schematic representation of the bistability of a SEED device with a voltage constrained current source;

DETAILED DESCRIPTION

Figure 1:
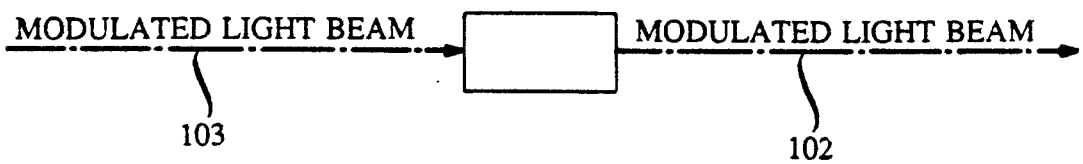
FIG. 1 is a schematic representation of a generic embodiment of the invention.

The invention involves locking the signal frequency of a signal-modulated optical carrier to the signal frequency of another signal-modulated optical carrier. A generic embodiment of the invention is shown in FIG. 1. In that Figure, 101, is a device that produces an output beam, 102, which is a signal-modulated optical carrier. The output optical carrier is modulated at a "signal" frequency. Directed into 101 is another signal-modulated optical carrier, 103, modulated at an input "signal" frequency. In the device, 101, the output signal frequency is "locked" in phase and frequency to the input signal frequency. As used here, the term "locked", "lock-in", or "injection-locked", refers to the characteristic of forced vibration well known in classical mechanics, and electronic and optical devices. As a result of this physical phenomenon, a given oscillation tends to replicate the frequency and phase characteristics of a different oscillation. The phenomenon is used, for example, in the well known injection-locked lasers. In such devices, the phase and frequency of the light emitted by the laser is "locked" to the phase and frequency of light which is injected into the laser. In the present invention, the signal frequency of the modulation of an output optical carrier wave is "locked" to the signal frequency of the modulation of an input optical carrier.

In alternative embodiments the input beam may comprise many Fourier-component signal frequencies and the output frequency may be "locked" to any of those frequencies. In one particular such embodiment, the input signal is a "data" or "bit" stream comprising optical pulses. The bit rate, and phase, of the data stream are determined by a "clock signal". In this particular embodiment of the invention, the output signal frequency in 102 may be locked to the clock signal, thereby recovering necessary timing information relating to the data stream, a critical step in regeneration. However, other uses for this ability to "lock" to an input frequency are apparent in optical signal processing, optical communication, and optical transmission, and they all are within the scope of this invention. Additionally, the device, 101, may be any appropriate element such as for example the self-oscillating laser, or a "SEED", and all such embodiments are also within the scope of the invention.

Figure 2:
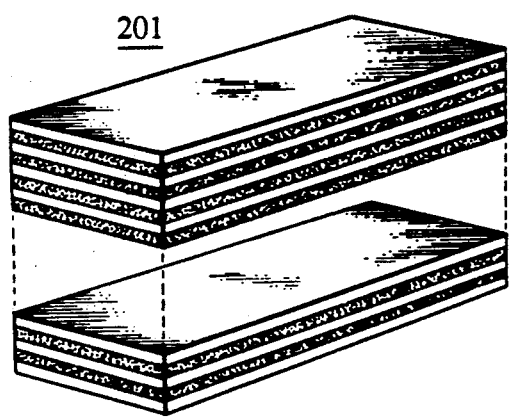
FIG. 2 is a schematic embodiment of a prior art Multiple Quantum Well (MQW) device which may be used in an embodiment of this invention.
Figure 3:
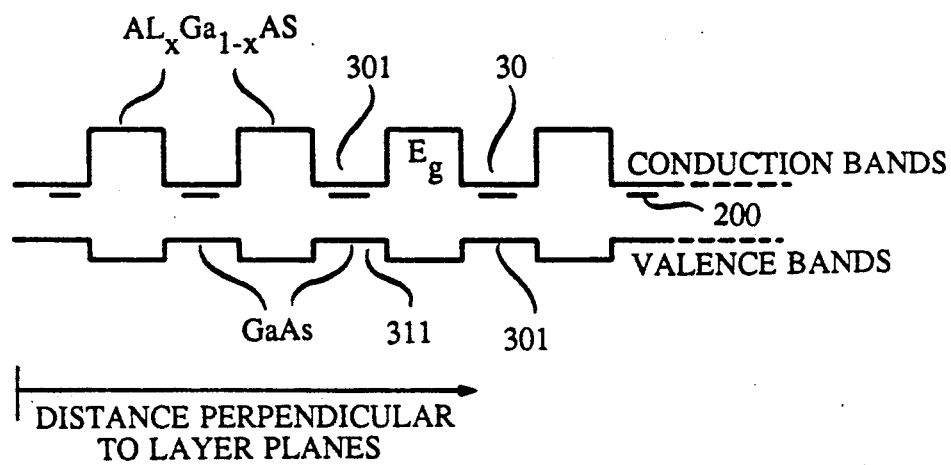
FIG. 3 is a schematic embodiment of the energy level diagram associated with an MQW device.
Figure 4:
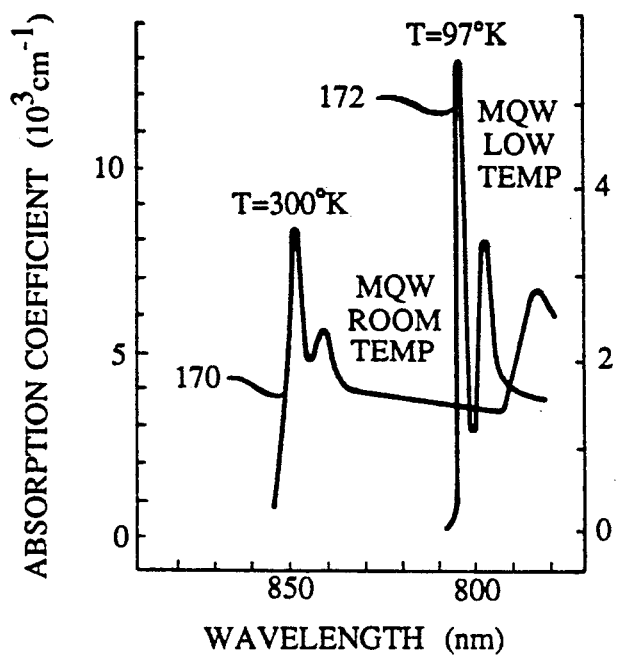
FIG. 4 is a representation of the exciton resonances which persist to room temperature in the MQW device.

In one specific embodiment of the invention, the device, 101, is based on the well known self-electro optic effect device (SEED) disclosed in U.S. Pat. No. 4,546,244. The SEED is in turn related to the Multiple Quantum Well (MQW) device. An exemplary MQW device is shown in FIG. 2. In that Figure, 201 comprises multiple alternating layers of different semiconductor material, i.e., a semiconductor multiple layer heterostructure. The layers alternate between wide bandgap material and narrow bandgap material, such as, for example, $Al_xGa_{1-x}As$ and GaAs, respectively. The energy level diagram for such a structure is shown in FIG. 3. The valence band of the wide bandgap material is lower than the valence band of the narrow bandgap material, while the conduction band of the wide bandgap material is higher than the conduction band of the narrow bandgap material. In FIG. 3, the regions shown as 302 are quantum wells—so named because the electrons and holes that are formed in this region, or that migrate to this region, are confined to these "well" regions by quantum effects. Confinement of these electrons and holes within a thickness, defined by the layer thickness, that is much less than the normal exciton diameter makes the exciton binding energy (the separation of the resonances from the bandgap) larger, without further increasing the phonon broadening. This, and other consequences of this "quantum confinement", explain the persistence of the resonances to room temperature as shown in FIG. 4. In addition, the energies of the confined electrons and holes are increased as a consequence of their confinement. This increased energy is called the "confinement energy". One incidental consequence of the quantum confinement is that it removes the degeneracy in the valence bands of the semiconductor resulting in the two exciton resonances shown in the figure, the "light hole" exciton, and the "heavy hole" exciton.

The SEED is based on the observation that when an electric field is applied perpendicular to the quantum well layers, the whole optical absorption edge, including the exciton resonances, moves to lower photon energies. Normal bulk semiconductors show very little, if any, shift in absorption edge. The only consequence of applying electric fields to a normal bulk semiconductor is the Franz-Keldish effect—a broadening of the bandedge with comparatively little shift. At low fields the exciton peaks broaden and disappear. However when perpendicular fields are applied to the MQW the excitons remain resolved to high fields.

The preservation of the exciton resonances when perpendicular fields are applied to MQW devices can be explained by considering the effect of an electric field on a confined electron hole pair. Normally the application of a field results in exciton broadening because of a shortening of the exciton lifetime due to ionization. However, since the confinement of the MQW device precludes exciton ionization, very large fields can be applied without ionization, and therefore without broadening of the exciton resonance. Additionally, and perhaps more importantly for this invention, there is a significant shift in the absorption edge due to the change in the confinement energy, associated with the application of the electric field and the consequent distortion of the well. This shift is the basis for the use of a MQW as a modulator. Since varying the applied field can significantly alter the light absorption properties of a properly biased MQW, light passing through the MQW will be modulated. Alternatively, modulated light passing through an MQW will result in a varying photocurrent.

Figure 5:
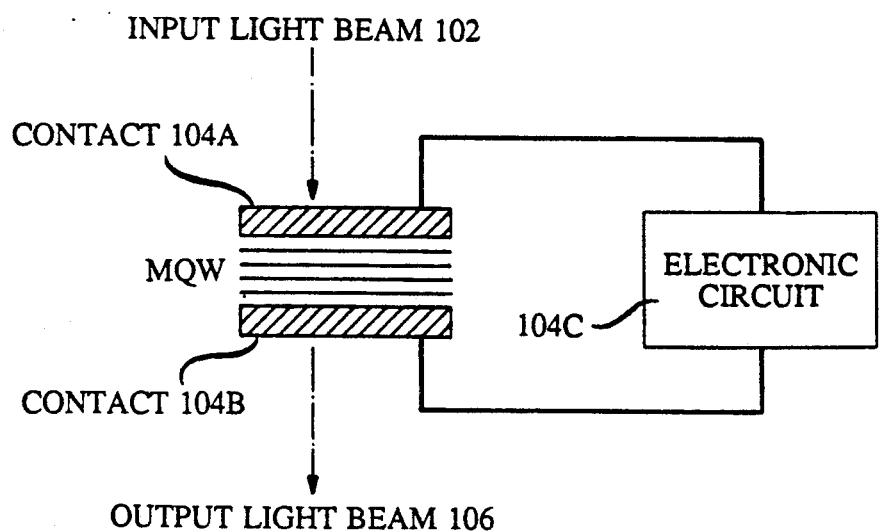
FIG. 5 is a schematic embodiment of a prior art Self-Electro Optic Device (SEED) which may be used in an embodiment of this invention.

The SEED as shown in FIG. 5, is based on the simultaneous operation of the MQW as both a modulator and a photodetector. In the SEED a feedback loop can be established since the photocurrent passing through the electronic circuit influences the voltage across the MQW modulator, and the voltage applied across the MQW modulator influences the absorption of light by the MQW modulator, and hence the photocurrent generated by the MQW modulator. The SEED is genuinely optoelectronic since it does not require any active electronic components or gain for its operation. Under positive feedback the SEED can operate as an "optical pulser", and such an "pulser" is suggested here for use as the novel "all-optical regenerator" embodiment of the present invention. (It is important to reemphasize that the "optical oscillator" frequency, as that term is used here, is not the frequency associated with the photons which make up the optical beam. It is rather the frequency at which the optical beam is modulated, i.e., "oscillates", or varies. In this usage, which is employed throughout this specification, the photon frequency is analogous to the carrier frequency of electronic devices, and the "oscillator frequency" is analogous to the frequency of the signal which, in both electronic and optical devices, modulates the carrier.)

The search for an all-optical regenerator has been ongoing for some time. However, a problem central to the design of any all-optical regenerator has not yet been solved—the problem of optical timing, i.e., recovering an optical clock signal from the input optical signal without transforming the optical signal into an electronic signal. To date, only the "untimed" optical regenerator has been suggested, since it does not require optical retiming. Such a regenerator is not a true "all-optical" regenerator, since the clock frequency associated with the data stream must be recovered by transforming the optical signal into an electronic signal. In contradistinction, this invention permits design of a genuine "all-optical" regenerator, since in this invention the clock signal associated with the data stream may be recovered without transforming the optical signal to an electronic signal.

DEFINITIONS

The term "optical" as used here refers to electromagnetic waves which are generally transmitted through dielectric media, such as glass fibers. As such, the "optical" wavelength range can extend beyond the "visible" range. Accordingly, it may extend, for example, from 0.2 microns to 15 microns.

The invention relates to "optical communication systems", and, in specific embodiments, may relate to such systems in their broadest sense. So, for example, the invention may be used in optical computers, and to the extent that such devices involve the transmission and/or processing of optical signals representative of intelligence, they are included within the scope of the term "optical communication system", as used here.

The invention is directed towards "all-optical" systems. That term, as used here, does not exclude the use of electrical devices or signals. In fact, in certain embodiments, electrical signals, associated, for example, with the SEED device, may be monitored, and electrical elements in such circuits, for example the tank circuit in the SEED oscillator, may be varied, either independently or in response to such monitoring. In such embodiments, elements of the inventive device may be used as electrical receivers and/or transmitters.

The term "all-optical pulser" refers to a device that has at least two characteristics, at least one of which is an optical characteristic, and in which there is an interaction, or feedback, between the at least two characteristics, which results in a variation or pulsation in the optical characteristic. Absent any other perturbations, the "all-optical pulser" may pulse at a given natural signal frequency. Exemplary of such all-optical pulsers is the self-pulsating laser. In embodiments of this invention, the "all-optical pulser" will have an associated output comprising a modulated optical beam. When the modulating signal is periodic, the "all-optical pulser" is referred to as an "all-optical oscillator". The SEED oscillator is one example of such an "all-optical oscillator".

Elements of the invention are used to recover the "clock frequency" associated with a "bit stream" or "data stream". In this context, the terms "bit stream" or "data stream" are used to indicate a temporal or spatial sequence of logic values. The "clock frequency" associated with such a bit stream is the number of logic values transmitted on such a bit stream per second. It should be understood that, for purposes of this invention, recovery of the clock frequency includes recovery not only of the clock frequency itself, but is meant to include, as well, the possible recovery of harmonics or subharmonics of the clock frequency.

The "optical decision element" to which the optical pulser is connected in the regenerator embodiment of the invention, may also be referred to as an "optical logic element". An optical decision or a logic element is a device which has at least one optical input, and at least one optical output, and in which the logical state or level of the optical output is related, by a prescribed relationship, to the current or past logical state or level of the optical input. However, in this context the term optical logic or decision element excludes devices which accept only one optical input, and have only one optical output whose logical state is approximately equivalent to the logical state of the optical input. In this context the terms "logic state" or "logic level" refer to a given range of values of some parameter of the input and output. Note, that the optical logic or decision elements may be "all-optical" elements.

A specific embodiment of this invention involves the all-optical "regenerator". In this context, the term "regenerate" or "regenerator" refers generally to the removal of distortion and/or the improvement in the signal to noise ratio of a given signal so as to replicate, as closely as possible, the original signal before the introduction of the distortion and the decrease in signal to noise. Regeneration generally involves the recovery of a clock frequency and the retiming, reshaping and amplification of the signal.

In the embodiment of the invention in which electric signals emitted by the all-optical devices are monitored, the all-optical devices may be used as receivers and/or transmitters in an optical communication system comprising a bus. So, for example, in the all-optical regenerator embodiment of the invention which involves a SEED, interaction with an exemplary electrical signal in the tank circuit connected to a SEED device may permit use of the device, not only as a regenerator, but as a receiver and/or transmitter in an exemplary bus system.

The term modulation, as used here in the context of a modulated optical carrier, refers to a variation in the intensity, frequency and/or phase of the optical carrier, which variation may be representative of intelligence.

The term SEED, as used here, refers generally to a device which has two characteristics, at least one of which is optical, and in which there is an interaction, or feedback between the two characteristics. The term SEED is defined, more specifically, by the claims of U.S. Pat. No. 4,546,244, entitled "Nonlinear Or Bistable Optical Device".

As noted above, the term "locked", "lock-in", or "injection-locked" refers to the characteristic of forced vibration, well known in the mechanical, electrical and optical arts. In the context of this invention, when one frequency is "locked" to another, there exists a relationship between the characteristics associated with the two frequencies. Exemplary of such characteristics which may be "locked", is frequency and/or phase values. Although the relationship need not be one of identity, in most idealized "lock-in" conditions characteristics associated with the two frequencies will be essentially identical to each other.

SPECIFIC EMBODIMENT OF THE INVENTION

In a specific embodiment of the invention, an injection-locked oscillator was used as part of an all-optical regenerator. The all-optical regenerator is a lightwave component of particular interest in optical communications. This component, as known from conventional lightwave regenerators, will have to perform a variety of tasks. A complete implementation of the all-optical regenerator has to detect an incoming optical signal, recover a reference clock, and then emit an amplified and retimed version of the original signal. Basic components within the all-optical regenerator might include optical clock oscillators, optical decision circuits, light amplifiers, and light sources. Clearly, the all-optical regenerator is a good candidate for integration if its basic functional blocks are realizable in one material system and if the optical circuit is feasible. Simplicity and low cost are important features of the all-optical regenerator if it is to compete with conventional ones.

Figure 6:
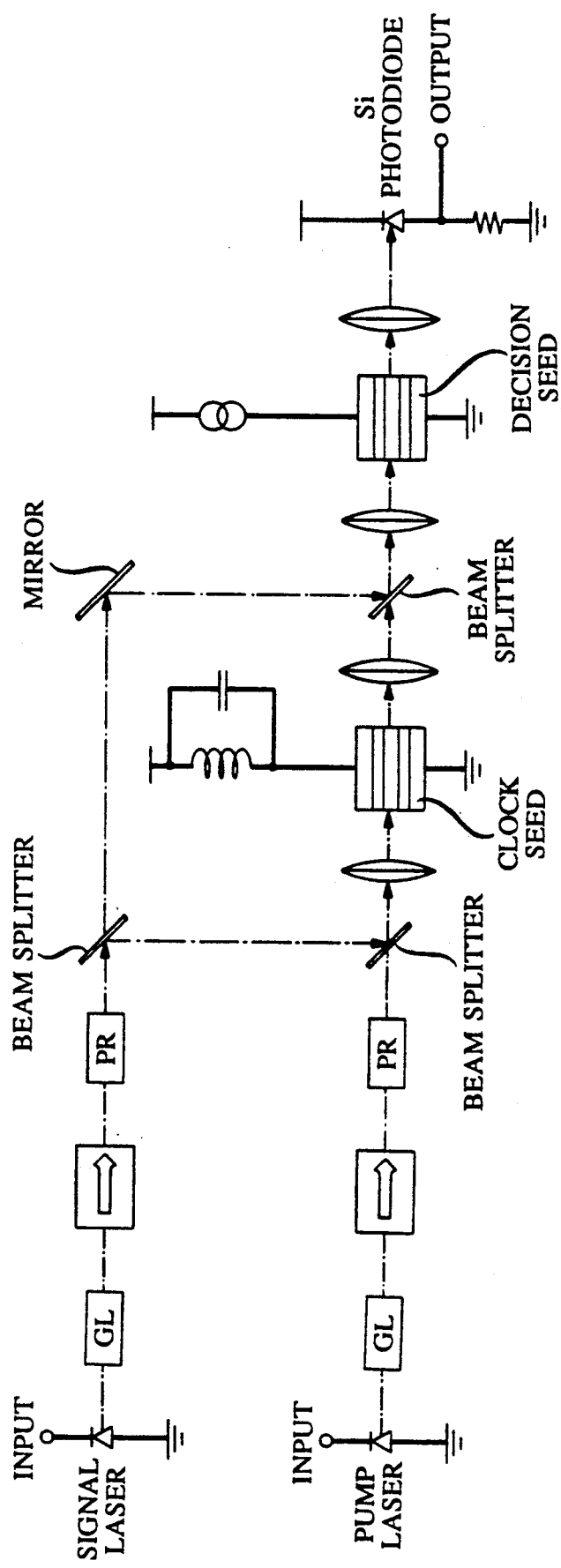
FIG. 6 is a schematic representation of one embodiment of the invention involving a two SEED optical regenerator, including an oscillator-SEED and a decision-SEED.

The all-optical regenerator which was constructed is a good candidate for such integration. It is shown in FIG. 6 and consists of two discrete SEEDs and a semiconductor cw pump laser whose light powered the optical circuit. At the regenerator input, the incoming signal beam was divided into two parts for the clock recovery and data retiming. Clock recovery was achieved by injection-locking a SEED oscillator to the clock tone in one of the input signal beams. The optical clock output from this first SEED was combined with the other signal beam in the second SEED. This second SEED was operated as a decision element whose optical output was a retimed and amplified version of the original input signal.

The semiconductor cw pump laser was used to operate the SEED as an oscillator. A second laser produced the input optical signal. The signal and pump lasers were 10 mW AlGaAs semiconductor lasers whose emission wavelengths were 852 and 856 nm, respectively. Although these were Fabry-Perot type lasers, single-mode output was obtained through careful adjustment of both injection current and temperature. The lasers could be modulated by AC coupled current injection, although when operated as a regenerator, only the signal laser was modulated. The lasers' outputs were collimated with 0.2 pitch selfoc lenses and sent through optical isolators and broadband polarization rotators.

1. The SEEDs

The two SEEDs were made from waveguide MQW modulators similar to those reported earlier, see, for example, T. H. Wood et al, *Electron. Lett.*, 21 (1985), p.693. In these devices, a set of 6 GaAs quantum wells, each 106 Å thick, was placed in the center of the 0.59 μm thick undoped region of a back-biased p-i-n diode. The wells were also in the center of 2.7 μm thick leaky waveguide, formed by a GaAs/AlGaAs superlattice core and a pure GaAs cladding. In this device, the overlap integral, see, for example, T. H. Wood et al, *Appl. Phys. Lett.*, 48 (1986), p. 1413, between the optical mode of the waveguide and the MQWs was estimated to be $\Gamma = 4.8\%$. The lengths of the retiming and decision SEEDs were 51 and 70 μm, respectively; we estimate the radiation losses from the leaky waveguides were 2.5 and 3.4 dB, respectively. The regenerator's total insertion loss for the pump beam, including coupling and beamsplitter losses, was 27 dB. Most of this loss was due to the strong electro-absorption in the quantum wells when biased at the voltages required for oscillation and bistability.

1.1 The Clock Recovery SEED

The clock recovery SEED was electrically biased through a resonant LC tank circuit and optically biased by the cw pump laser. Microscope objective lenses focussed light into and collected light from this and the decision SEED. Once biased, the clock recovery circuit became a negative resistance oscillator with time varying SEED voltage and optical output, see, for example, the Miller et al (1985) reference, op. cit. As seen in FIG. 6, the signal beam had been divided into two paths to enable the clock recovery and data retiming. Clock recovery was done by injection-locking the SEED oscillator to the clock tone in one of the modulated signal beams. The oscillator's optical output, now the optical clock, was combined with the remaining signal beam and injected into the decision SEED. This SEED was reverse-biased through a photodiode constant current source, see, for example, the Miller et al (1985) reference, op. cit. to enable logical switching for the signal retiming. The current source was designed to allow independent control of the current setting, $I_{source}$, the minimum output voltage, $V_{min}$ and the maximum output voltage, $V_{max}$. Once the current source parameters were properly set, a regenerated optical signal was obtained at the output of the decision SEED.

1.11 The Lock-In Characteristics Of the Clock Recovery SEED

The clock oscillator's large signal oscillation and injection lock-in behavior are important attributes of the regenerator's performance. Large signal analysis of the oscillator circuit yields a differential equation whose terms include I(V), the SEED's photocurrent as a function of voltage for constant input optical power. The SEED's optical transmission versus voltage curve, L(V), is used to calculate the optical clock waveform once V(t) is determined. FIG. 7 shows the I(V) and L(V) curves of the oscillator SEED as measured at the pump laser wavelength $\lambda_p = 856$ nm. The region of interest for oscillation is in the negative resistance portion of the I(V) curve around $V_{bias} = 5V$. The differential equation describing the oscillator circuit illustrated in FIG. 8a is, see, for example, the Miller et al (1985) reference, op. cit.

$$\frac{d^2V}{d\tau^2} + \left(\frac{R}{\delta} + \delta\frac{dI}{dV}\right)\frac{dV}{d\tau} + (V - V_\beta + RI(V)) = 0 \quad (1)$$

where time is normalized to $$\frac{1}{\sqrt{LC}},$$

and δ is a circuit parameter $$\sqrt{\frac{L}{C}}.$$

L,C and R are the circuit elements of the external tank circuit. We solved this equation by Runge-Kutta methods with I(V) and dI/dV obtained by a cubic spline fit to the measured I-V curves. The initial conditions $V=V_o$ and $dV/dT=V_o$ determine the approach to the steady-state oscillation for the bias voltage, $V_B$. The optical output was calculated from L(V(t)), where L(V) was determined by a cubic spline fit to the measured L-V.

A representative calculation is shown in FIG. 8b where $\delta=1\times10^4$ and $I_{max}=0.6$ mA, corresponding to typical operating conditions. A damping resistance, $R=200$ ohm was empirically found to give the best agreement between the calculated and observed conditions. The SEEDs voltage varies sinusoidally 4.5 V p-p, centered about the bias voltage $V_B=5V$. The optical oscillation is nearly squarewave with 13 dB extinction ratio. The optical duty cycle was sensitive to bias conditions—increasing $V_B$ produced low extinction negative-going pulses while lowered $V_B$ resulted in positive-going pulses.

These predictions of the SEED's oscillation behavior were verified in this specific embodiment. FIG. 9 is a photograph of the SEEDs optical output where the tank circuit resonant frequency was 173 kHz with $L=10$ mH and $C=100$ pF. The optical extinction ratio was only 8 dB because the bias voltage was adjusted to obtain the best waveform symmetry. Parasitic SEED capacitance and the oscillator being nonlinear, led to a bias-voltage-dependent frequency deviation of 90 Hz/V. This frequency variation did not affect the regenerator as the bias voltage to the clock recovery SEED was kept constant. Other LC tank circuits were constructed with 5 kHz resonant frequencies for use in the regenerator experiments.

The optical clock signal was recovered by injection locking the SEED oscillator to the clock tone in the incoming modulated beam. This is explained with the help of FIG. 5a which shows the tank circuit in parallel with the SEED's negative conductance and $\delta I$, the peak-to-peak value of the time varying photocurrent induced by the injected signal. The locked-in condition is given by, see, for example, K. Kurokawa, Proc. IEEE, 61 (1973), pp. 1386-1410

$$(G_{RLC}+G_{SEED})V=\delta I \tag{2}$$

where $G_{RLC}$ and $G_{SEED}$ are the tank circuit and SEED conductances, respectively, at the lock-in frequency. V is the peak-to-peak oscillating voltage across the circuit. For $R<<\omega_o L$ and expanding the frequency about the resonant frequency, i.e., $\omega=\omega_o+\Delta\omega$, $G_{RLC}$ is:

$$G_{RLC}+\frac{2\Delta\omega}{\omega_o^2 L}. \tag{3}$$

Close to the lock-in limits, $G_{SEED}$ is small as compared to Im ($G_{RLC}$) which leads to a simplified lock-in equation:

$$\frac{2\Delta\omega}{\omega_o^2 L} = -j\frac{\delta I}{V}e^{j\theta} \tag{4}$$

where $\theta$ is the phase angle between the injection photocurrent and the SEED voltage. The time varying factor of the injection current, $\delta I$, is omitted in this rotating wave notation. The lock-in range is determined by the phase angle, $\theta$, varying from $-90°$ to $+90°$, as seen in the complex conductance plane of FIG. 10b. From this the normalized lock-in range (valid for small $|\delta I|$) is:

$$\frac{2\Delta f}{f_o} = 2\pi\frac{\delta I}{V}f_o L. \tag{5}$$

Taking parameters for the previously mentioned 173 kHz tank circuit and assuming $\delta I=1$ $\mu A$, the predicted lock-in range is $2\times10^{-3}$. This range is more than adequate for transmission systems operating with stable master clocks. However, it is obvious that a signal clock tone and the oscillator natural frequency have to be more closely matched to limit the clock phase deviation to small values.

Measurements of the SEED oscillator lock-in range and phase were taken with the 173 kHz resonant circuit. The experiment was simplified by using only the pump laser and locking to a small square-wave modulation superimposed on its DC bias. FIG. 10 plots the lock-in range as a function of $\delta I$ when the average SEED photocurrent was 0.81 mA. The lock-in range linearly increased with $\delta I$ about the 172.9 kHz center frequency. At $\delta I=4.4$ $\mu A$, the normalized lock-in bandwidth was 0.010, as predicted from Equation 3. The injection lock phase as a function of the clock tone frequency is also plotted in FIG. 10. The observed phase excursion over the whole lock-in range was 172°. These results highlight the requirement of a stable signalling rate to ensure proper retiming in the regenerator with low power injection signals.

Figure 12:
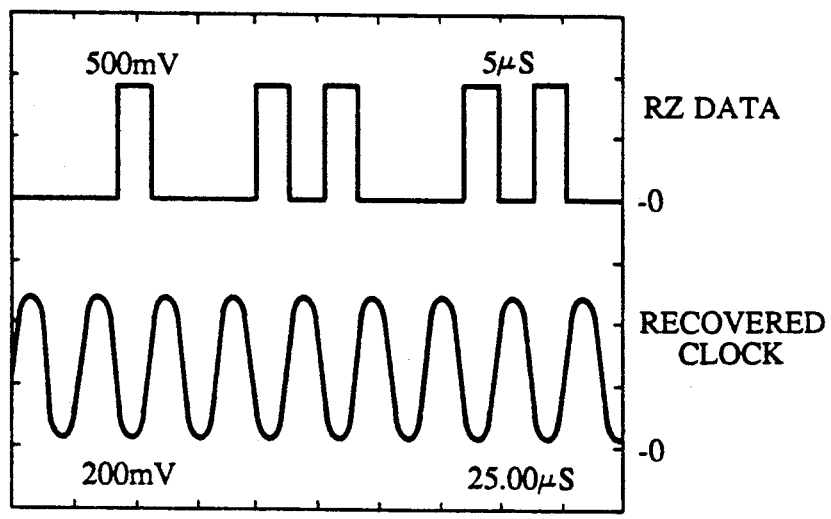
FIG. 12 represents the results of an oscillator injection-locked to an RZ data stream. The upper trace represents the input data and the lower trace represents the optical clock output.

The SEED oscillator was readily locked to the clock tone of an RZ data stream, as seen in FIG. 12. Both the pump and signal lasers were used in this demonstration. A portion of the $2^{10}$ pseudorandom bit stream modulating the signal laser is shown in the upper trace. The lower trace is the injection locked oscillator's optical output for $I_{seed}=0.81$ mA and $\delta I=4$ $\mu A$. The SEED bias voltage has been adjusted to obtain an 11 dB optical extinction ratio.

The oscillation output was 180 degrees out of phase with the RZ data so that the optical clock output was low when the data was high. Ideally the clock and data should be in phase when entering the retiming SEED. Consequently, as described later, the data stream had to be specially tailored to demonstrate regeneration with data inversion. This situation could be remedied with tandem SEED oscillators where the output oscillator is locked to the input oscillator which in turn is locked to the incoming signal. Alternatively, active oscillator electronics could produce the requisite 360 degree phase shift.

1.2 The Decision Seed And The Decision Circuit

The second SEED acted as a decision element controlled by optical clock and data inputs. By adjusting the operating parameters of the current source, one of two operating modes could be selected. In the first mode, the SEED behaved as an optical AND gate which sampled the incoming data. The second mode did have bistable action where the SEED retimed and inverted the data. This latter action is similar to the inverting output of a D flip-flop in conventional electronics.

FIG. 13a will help to explain the AND gate operation of the decision circuit. The current source load line is plotted over the SEED I(V) and L(V) curves for two optical inputs. With low input signals, the I(V) curve intersects the load-line at point A which causes the modulator to be biased at the minimum transmission point A'. However, if the SEED photocurrent increases, the I(V)/load-line intersection moves to B with the corresponding peak transmission at B'. FIG. 13b shows an example where this nonlinear action behaves as an AND gate. The upper trace is the data signal which is combined with the output from the clock recovery SEED. The peak photocurrents of both the clock and data were approximately 7.2 μA. The lower trace is the SEED's output with the clock pulses appearing only when the data is high. This operating mode is similar to that of the multiple quantum well modulator, see, for example, T. H. Wood et al, *Appl. Phys. Lett.*, 44, (1984), p. 16, only now modulation is induced optically rather than electrically. Since the switching voltage is lower in this case, it's expected that the AND gate should be inherently faster than the bistable mode.

SEED bistability is obtained by adjusting the current source compliance voltages around the heavy-hole excitation peak of the SEED's I-V characteristic. This is illustrated in FIG. 14 which shows a bistability loop of $P_{out}$ versus $P_{in}$ and the matching I-V, L-V characteristics. The current source settings were $V_{min}=3V$, $V_{max}=12V$ and $I_{source}=2.5$ μA. Beginning with point D, the output optical power increases with increasing input optical power until the load-line intersects the I-V curve at A and the device switches to the low transmission state at point 3 where $V_{seed}=V_{min}$. The SEED voltage remains close the $V_{min}$ until the load-line intersects point C after which the device reverts to the high transmission state, D. Later we will describe how this bistability enables the SEED to retime data to the clock pulses produced by the clock recovery SEED.

2. The All-Optical Regenerator

The optical regenerator was made by cascading the clock recovery and decision SEEDs. The decision SEED was operated in either the bistable or the AND gate switching modes. Stray capacitance in the current source limited the SEED's minimum switching speed to 10 μsec. This slow switching time limited the regenerator's maximum signalling rate—5 kB/sec was chosen to enable a clear study of the regenerator's behavior. Higher data rates would be attainable by increasing the decision SEED photocurrent with either larger pump powers or with low-loss clock recovery SEEDs. Further improvement would result by lowering the current source capacitance, possibly by integrating the current source with the SEE, see, for example, the Wood et al (1985) reference, op. cit. A high-speed regenerator would likely have the clock recovery and decision SEEDs integrated onto a single chip.

Regeneration was demonstrated with a 5 kB/s RZ data pattern which consisted of a long preamble of "1"'s followed by a short random sequence which had a 180 degree phase slip relative to the preamble. Consequently, the recovered optical clock, although shifted 180 degrees with respect to the preamble, was in phase with the random sequence. Now data could be regenerated in either of the decisions SEED's two operating modes.

Figure 16:
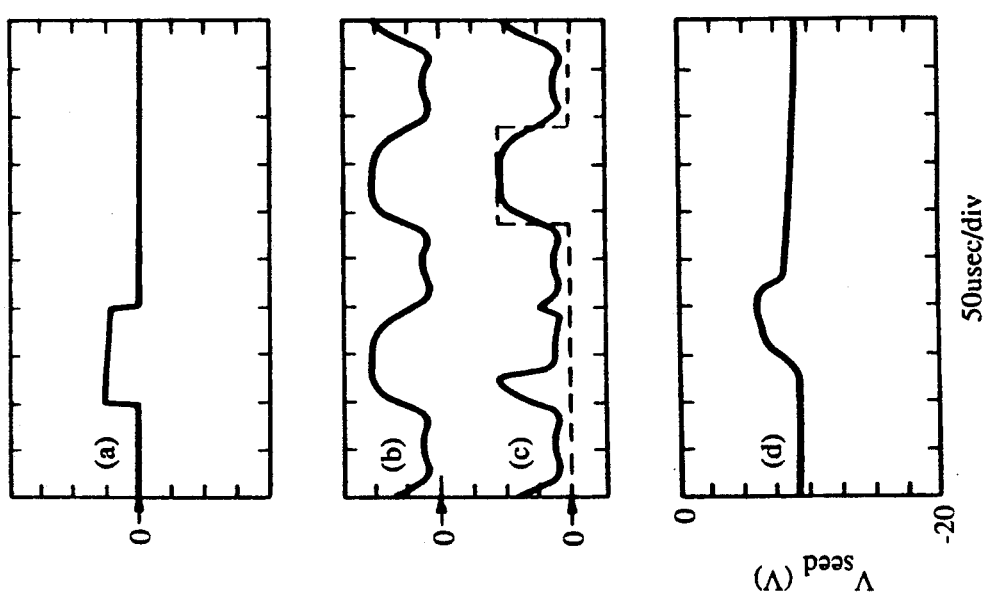
FIG. 16 is a schematic representation of optical regeneration with the decision-SEED biased for bistable operation. (a) shows the input data pattern; (b) shows the recovered optical clock; (c) shows the optical output (dashed line indicates ideal waveform); and (d) shows the decision-SEED voltage.
Figure 15:
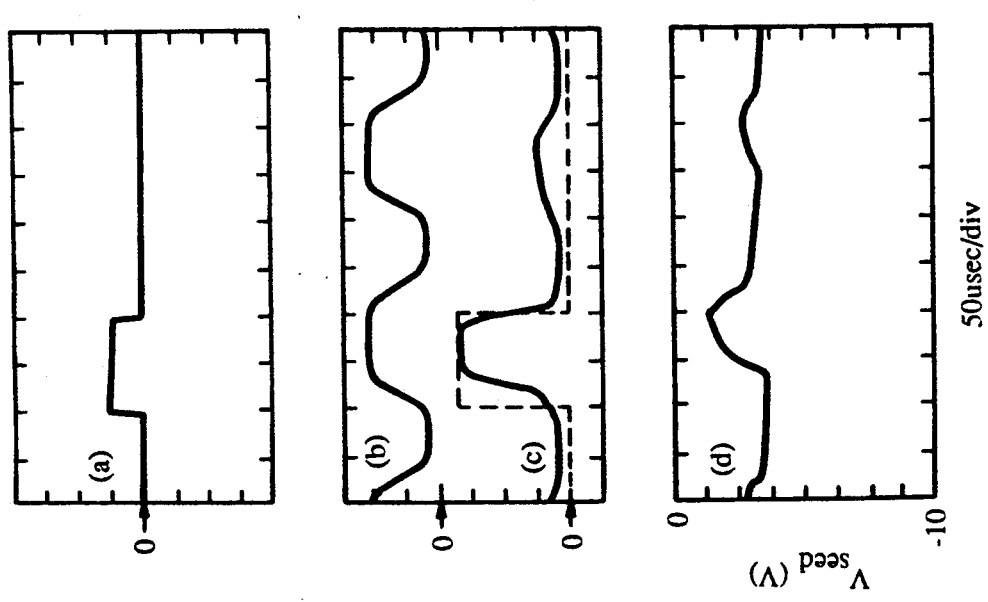
FIG. 15 is a schematic representation of optical regeneration with the decision-SEED biased for AND gate operation. (a) shows the input data pattern; (b) shows the recovered optical clock; (c) shows the optical output (dashed line indicates ideal waveform); and (d) shows the decision-SEED voltage.

FIGS. 15 and 16 show the optical and electrical signals at various positions during optical signal regeneration. The displays are approximately centered on a "010" RZ sequence. The clock recovery SEED's average photocurrent was 1.5 mA, which 2 μA was injection locking photocurrent from the signal beam. The optical clock and the second signal beam were injected into the decision SEED to produce average photocurrents of 13.1 μA and 1.7 μA, respectively. Stable injection locking and well defined decision switching was easily obtained with these large signal photocurrents.

The regenerator's optical output with the decision SEED biased to operate as an AND gate is shown in FIG. 15. Here $I_{source}=15$ μA, $V_{min}=0$ V and $V_{max}=4$ V. The optical contrast ratio between "0" and "1" outputs is 5.5 dB. The voltage across the decision SEED was monitored with a 10X, 10 Mohm oscilloscope probe. (Voltage was recorded as negative values because the reverse-biased SEED was mounted with the "N" side grounded.) The decision SEED's voltage differed by 1.0 V between the high and low output states. Note that this voltage and that across the clock recovery SEED are readily accessible, allowing the regenerator to also act as a complete optical receiver.

Figure 11:
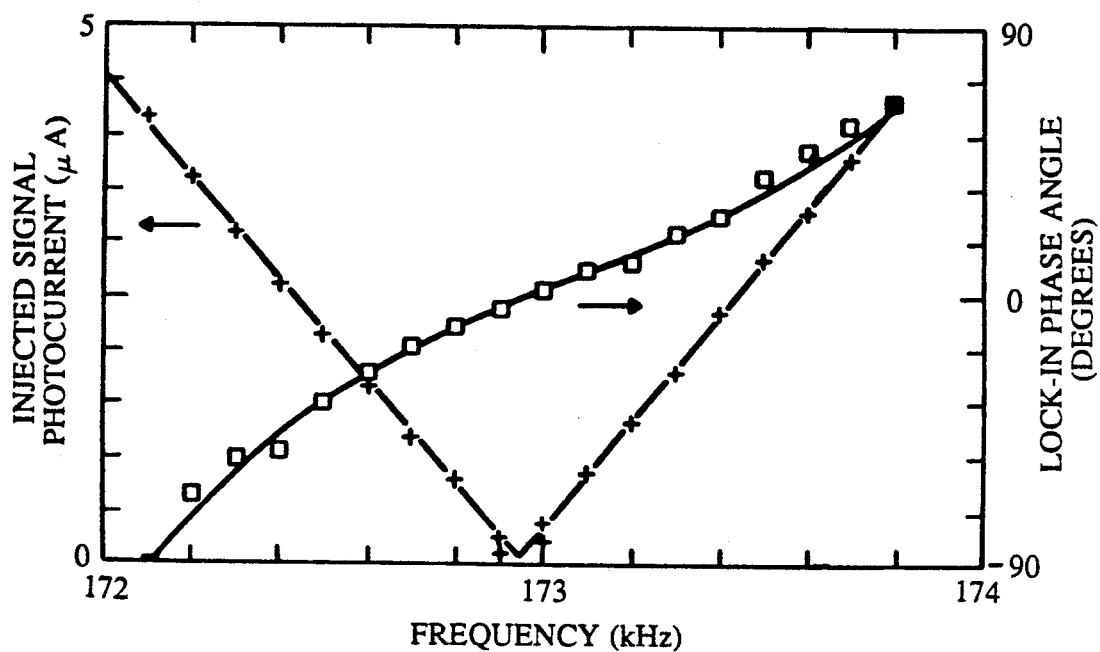
FIG. 11 is a schematic representation of the oscillator lock-in frequency range and output phase shifts. The phase shift is measured with $\delta I_{p-p} = 4.4$ $\mu$A.

Regeneration was next done with the same test conditions only the decision SEED's operation was adjusted to the bistable mode and the SEED oscillator bias adjusted slightly to obtain a more symmetric clock waveform. The decision SEED's current source was set to $V_{min}=3.5$ V, $V_{max}=11$ V and $I_{source}$ was left unchanged from the AND gate operation. In this mode, the regenerator inverted the RZ data. Note that a 30 μsec wide triangular pulse appears in FIG. 11c where the optical output should be low since a "1" was inverted to a "0". This pulse was an artifact of the optical clock having a slow risetime, and might be eliminated with an improved SEED oscillator, such as a relaxation oscillator, see, for example, S. P. Gentile, *D. Van Nostrand Co.* (1962). Alternatively, a third SEED at the decision SEED's output could be biased as a saturable absorber to reduce the energy of this output glitch. Even with this extraneous pulse, the energy ratio between regenerated "1"s and "0"s was better than 2-to-1.

Optical gain through the bistable regenerator was achieved with 0.87 μW of signal power injected into each of the clock recovery SEED and the decision SEED. The average output optical power was 3.28 μW, which after correcting for the output extinction ratio, corresponded to a 2 dB gain in the peak-to-peak signal power through the SEED. Much higher optical gains would be obtainable with either a stronger pump laser or lower loss SEEDs. The decision circuit easily distinguished between "0"s and "1"s when the injected clock power was 15 dB greater than the signal power. This switching gain, less the decision SEED loss, is the maximum achievable optical gain with this type of regenerator.

In most applications, it is important that an optical regenerator work for any input signal polarization. This was checked on the SEED regenerator by installing polarization insensitive beamsplitters and rotating the input signal polarization with a prism polarization rotator. Other than a slight change in the optical clock phase, the regenerator's behavior was unaffected by varying the signal polarization. In contrast, the pump laser's polarization had to be maintained close to TM to enable oscillation and bistability. Thus, injection locking and bistable switching only require perturbations in the SEED photocurrent once negative resistance is established by the pump laser. Consequently, the SEED regenerator does not need polarization control on the signal beam even though multiple quantum well waveguide properties are polarization dependent, see, for example, J. S. Weiner, et al, *Appl. Phys. Lett.*, 47, (1985), pp. 1148–1150.

What is claimed is:

1. A method comprising,
   directing an optical input into an all-optical pulser, the said optical input comprising an optical beam modulated by an first signal, which first signal comprises at least one first signal Fourier component, and the optical output of said all-optical pulser comprising an optical beam modulated by an second signal, which second signal comprises at least one second signal Fourier component, and
   locking at least one characteristic of the second signal to at least one characteristic of the first signal,
   whereby the phase and frequency of the said second signal Fourier component is locked to the phase and frequency of the said first signal Fourier component.

2. The method of claim 1 wherein said all-optical pulser comprises a Self Electro-optic Effect Device.

3. The method of claim 2 wherein the output of said all-optical pulser is directed into an optical logic element.

4. The method of claims 3 wherein the input signal, in addition to being directed into said all-optical pulser, is also directed into said optical logic element.

5. The method of claim 4 wherein,
   said first signal comprises a bit stream representative of intelligence, and,
   said first signal Fourier component is related to the clock frequency of said bit stream,
   whereby the output of said logic element is the regenerated first signal.

6. The method of claim 4 wherein said optical logic element is a Self-Electro-optic Effect Device.

7. The system of claim 6 wherein the frequency of said first signal Fourier component is within the lock-in range of the natural frequency of the said all-optical pulser.

8. The method of claim 1 wherein the frequency of said first signal Fourier component is within the lock-in range of the natural frequency of the said all-optical pulser.

9. The method of claim 1 wherein the output of said all-optical pulser is directed into an optical logic element.

10. A device comprising
    an optical source, the output of said optical source comprising an optical beam modulated by a signal, which signal comprises at least one signal Fourier component,
    an all-optical pulser, the output of said all-optical pulser comprising an optical beam modulated by a signal comprising at least one signal Fourier component,
    an optical logic element, means for directing the output of the said optical source into the said all-optical pulser, and
    means for directing the output of said all-optical pulser into the said optical logic element.

11. The system of claim 10 further comprising means for measuring the relationship between
    (a) the phase and/or frequency of the input signal Fourier component, and
    (b) the phase and/or frequency of the output signal Fourier component.

12. The system of claim 10 or 11 wherein said all-optical pulser comprises a Self-Electro-optic Effect Device.

13. The system of claim 10 or 11 wherein said logic element comprises a Self Electro-optic Effect Device.

14. The system of claim 13 further comprising
    means for monitoring an electrical signal emitted by the SEED pulser, and
    means for varying an electrical element associated with an electrical circuit connected to the SEED pulser, in response to said monitored signal.

15. The system of claim 14 wherein the said electrical circuit connected to the said SEED is a tank circuit, and an electrical element of the tank circuit is varied, whereby the frequency of the tank circuit may be varied to control the said relationship between
    (a) the phase and/or frequency of the input signal Fourier component, and
    (b) the phase and/or frequency of the output signal Fourier component.

16. An optical communication system comprising the device of claim 10.

17. A device comprising
    an optical pulser, each of whose output and input comprises optical beams modulated by signals, which signals comprise at least one signal Fourier component,
    means for measuring the relationship between
    a. the phase and/or frequency of the input signal Fourier component, and
    b. the phase and/or frequency of the output signal Fourier component.

18. The system of claim 17 further comprising,
    means for monitoring an electrical signal emitted by the said optical pulser, and,
    means for varying an electrical element associated with an electrical circuit connected to the said optical pulser in response to said monitored signal.

19. The device of claim 17 further comprising,
    means for directing the output of said pulser into a logic element.

20. The systems of claim 10 or 19 further comprising means for extracting an electrical signal, representative of intelligence, from at least one of the pulser or logic element.

21. The system of claim 20 further comprising means for inputting an electrical signal representative of intelligence into at least one of the said pulser or logic element.

22. The device of 19 wherein said logic element comprises a Self Electro-optic Effect Device.

23. The device of claim 22 wherein said pulser comprises a Self Electro-optic Effect Device.

24. An optical communication system comprising the device of claim 17.

25. The device of claim 17 wherein said pulser comprises a Self Electro-optic Effect Device.

* * * * *